United States Patent
Huntzicker et al.

(10) Patent No.: US 8,499,154 B2
(45) Date of Patent: Jul. 30, 2013

(54) SYSTEM AND METHOD FOR ESTABLISHING A SECURE CONNECTION WITH A MOBILE DEVICE

(75) Inventors: Fred W. Huntzicker, Ann Arbor, MI (US); Ansaf I. Alrabady, Livonia, MI (US); David Racklyeft, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 600 days.

(21) Appl. No.: 12/360,266

(22) Filed: Jan. 27, 2009

(65) Prior Publication Data

US 2010/0191973 A1  Jul. 29, 2010

(51) Int. Cl.
*H04L 63/08* (2006.01)

(52) U.S. Cl.
USPC .............. 713/168; 713/175; 713/176; 726/17

(58) Field of Classification Search
USPC .......................................... 713/176; 380/270
See application file for complete search history.

(56) References Cited

U.S. PATENT DOCUMENTS

| | | | | |
|---|---|---|---|---|
| 6,009,177 | A * | 12/1999 | Sudia | 713/191 |
| 6,513,118 | B1 * | 1/2003 | Iwamura | 713/176 |
| 6,560,339 | B1 * | 5/2003 | Iwamura | 380/201 |
| 6,886,095 | B1 * | 4/2005 | Hind et al. | 713/168 |
| 7,134,024 | B1 * | 11/2006 | Binding et al. | 713/187 |
| 8,078,876 | B2 * | 12/2011 | Brickell et al. | 713/176 |
| 2002/0038420 | A1 * | 3/2002 | Collins et al. | 713/156 |
| 2004/0003231 | A1 * | 1/2004 | Levenson et al. | 713/155 |
| 2004/0003237 | A1 * | 1/2004 | Puhl et al. | 713/156 |
| 2004/0243805 | A1 * | 12/2004 | Enokida | 713/175 |
| 2004/0260928 | A1 * | 12/2004 | Immonen | 713/175 |
| 2004/0264697 | A1 * | 12/2004 | Gavrilescu et al. | 380/255 |
| 2005/0033957 | A1 * | 2/2005 | Enokida | 713/156 |
| 2005/0097314 | A1 * | 5/2005 | Matsushima | 713/156 |
| 2005/0120203 | A1 * | 6/2005 | Yeh et al. | 713/156 |
| 2006/0020782 | A1 * | 1/2006 | Kakii | 713/156 |
| 2006/0036850 | A1 * | 2/2006 | Enokida | 713/156 |
| 2006/0085634 | A1 * | 4/2006 | Jain et al. | 713/156 |
| 2006/0085646 | A1 * | 4/2006 | Cutter et al. | 713/175 |
| 2007/0055865 | A1 * | 3/2007 | Kakii | 713/156 |
| 2007/0074282 | A1 * | 3/2007 | Black et al. | 726/14 |
| 2007/0143608 | A1 * | 6/2007 | Zeng et al. | 713/168 |
| 2007/0198830 | A1 * | 8/2007 | Imai | 713/156 |
| 2007/0204149 | A1 * | 8/2007 | Balfanz et al. | 713/156 |
| 2007/0245138 | A1 * | 10/2007 | Camenisch | 713/156 |

(Continued)

OTHER PUBLICATIONS

Ge et al., "A Direct Anonymous Attestation Scheme for Embedded Devices," 2007, International Association for Cryptologic Research, pp. 16-31.*

(Continued)

*Primary Examiner* — Luu Pham
(74) *Attorney, Agent, or Firm* — Ingrassia Fisher & Lorenz, P.C.

(57) ABSTRACT

Methods and apparatus are provided for establishing a secure connection with a mobile device that is configured to store a first private key that mathematically corresponds to a first public key. The method comprises receiving a quasi-public key from a trusted entity, wherein the quasi-public key mathematically corresponds to a quasi-private key that is stored on the mobile device, receiving a first digital certificate from the mobile device, the first digital certificate comprising the first public key and a first digital signature generated with the quasi-private key, and authenticating the first digital certificate using the first digital signature and the quasi-public key.

8 Claims, 2 Drawing Sheets

U.S. PATENT DOCUMENTS

2007/0255661 A1* 11/2007 Yoshida et al. ............... 705/74
2008/0027602 A1* 1/2008 Yeap et al. ................... 701/29
2008/0104401 A1* 5/2008 Miyamoto et al. ........... 713/175
2008/0270786 A1* 10/2008 Brickell et al. .............. 713/155
2009/0024852 A1* 1/2009 Yonezawa et al. ........... 713/180
2010/0169650 A1* 7/2010 Brickell et al. .............. 713/176

OTHER PUBLICATIONS

Kung, Antonio, "Secure Vehicle Communication—Deliverable 2.1—Security Architecture and Mechanisms for V2V/V2I," Feb. 2008, SeVeCom Project., pp. 9-65.*

Leung et al., "Using Trusted Computing to Secure Mobile Ubiquitous Environments," Dec. 2007, University of London, pp. 1-36.*

* cited by examiner

SYSTEM AND METHOD FOR ESTABLISHING A SECURE CONNECTION WITH A MOBILE DEVICE

TECHNICAL FIELD

The present invention generally relates to electronic communications, and more particularly relates to a system and method for establishing a secure connection with a mobile device.

BACKGROUND OF THE INVENTION

Increasingly, vehicles are being configured with vehicular communications systems (VCSs) that enable them to communicate with one or more remote devices via an electronic network. For example, a VCS may communicate with an Internet server, or other network server, belonging to the manufacturer of the vehicle, the dealership for the vehicle, or a third party. The VCS and the remote device may communicate regarding a variety of issues, including the current position of the vehicle, the current operational state of the vehicle, and/or input that is provided by the user of the vehicle.

Many VCSs are configured to use a secure communication protocol, such as the Transport Layer Security (TLS) protocol, for communicating with the remote device. Such protocols use digital certificates that are issued by a trusted certificate authority to enable the VCS and remote device to authenticate each other. For example, a VCS and a remote device may establish a one-way TLS session requiring the remote device to transmit a digital certificate to the VCS. The VCS uses this digital certificate to verify that the remote device is a trusted entity. However, the one-way TLS session does not require the VCS to transmit a digital certificate to the remote device. Thus, the remote device is not able to verify that the VCS is a trusted entity, enabling a third-party to pose as the VCS for the purpose of communicating with the remote device.

To decrease the possibility that a third-party could pose as a valid VCS for the purpose of communicating with a remote device, a two-way TLS session may be established. During the creation of a two-way TLS session the VCS and the remote device exchange digital certificates enabling the VCS to verify that the remote device is a trusted entity and the remote device to verify that the VCS is a trusted entity. However, the use of a two-way TLS session requires that each VCS be provisioned with its own digital certificate, requiring the manufacturer of the vehicle to maintain a certificate authority or purchase a large number of digital certificates from a third-party certificate authority and resulting in significant costs.

Accordingly, it is desirable to provide a method for establishing a secure connection between a VCS and a remote device in which both devices exchange digital certificates. In addition, it is further desirable to provide a method for provisioning multiple VCSs with digital certificates without requiring the manufacturer to maintain a certificate authority or purchase a large number of digital certificates from a third-party. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A method is provided for establishing a secure connection with a mobile device that is configured to generate and store a first private key that mathematically corresponds to a first public key. The method comprises receiving a quasi-public key from a trusted entity, wherein the quasi-public key mathematically corresponds to a quasi-private key that is stored on the mobile device, receiving a first digital certificate from the mobile device, the first digital certificate comprising the first public key and a first digital signature generated with the quasi-private key, and authenticating the first digital certificate using the first digital signature and the quasi-public key.

In other embodiments a vehicular communication system is provided for establishing a secure connection with a first device. The vehicular communication system comprising a wireless transceiver for communicating with the first device, electronic memory that stores a quasi-private key that mathematically corresponds to a quasi-public key stored on the first device, and a processor coupled to the wireless transceiver and to the electronic memory. The processor is configured to generate an asymmetric key pair comprising a vehicle private key that mathematically corresponds to a vehicle public key, generate a first digital certificate comprising the vehicle public key and a digital signature generated with the quasi-private key, and transmit the first digital certificate to the first device.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

Figure 2:
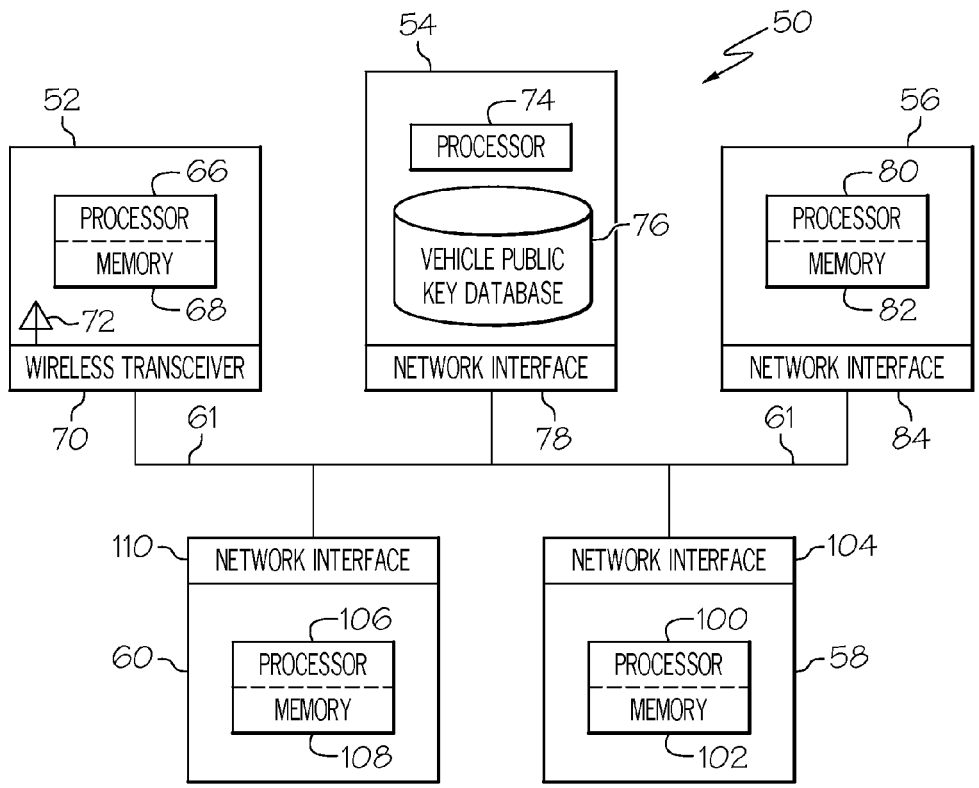
FIG. 2 is a block diagram of a method for establishing a secure connection between a mobile device and a remote device.
Figure 3:
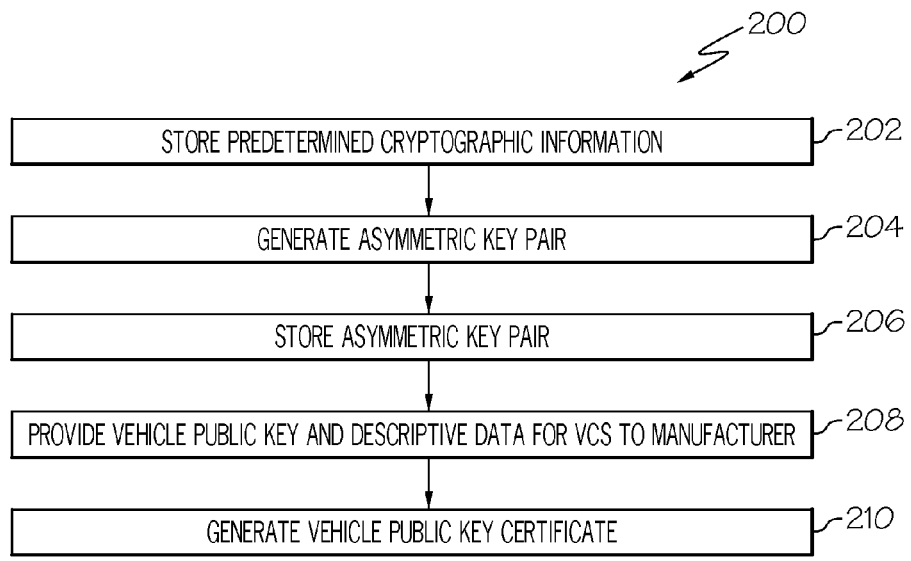
FIG. 3 is a flowchart of a method 200 for performing an asymmetric key exchange between a vehicular communication system and a remote device.

The following detailed description is merely exemplary in nature and is not intended to limit the invention or the application and uses of the invention. Furthermore, there is no intention to be bound by any expressed or implied theory presented in the preceding technical field, background, brief summary or the following detailed description. It should also be understood that FIGS. 1-3 are merely illustrative and, particularly with respect to FIG. 1, may not be drawn to scale.

Figure 1:
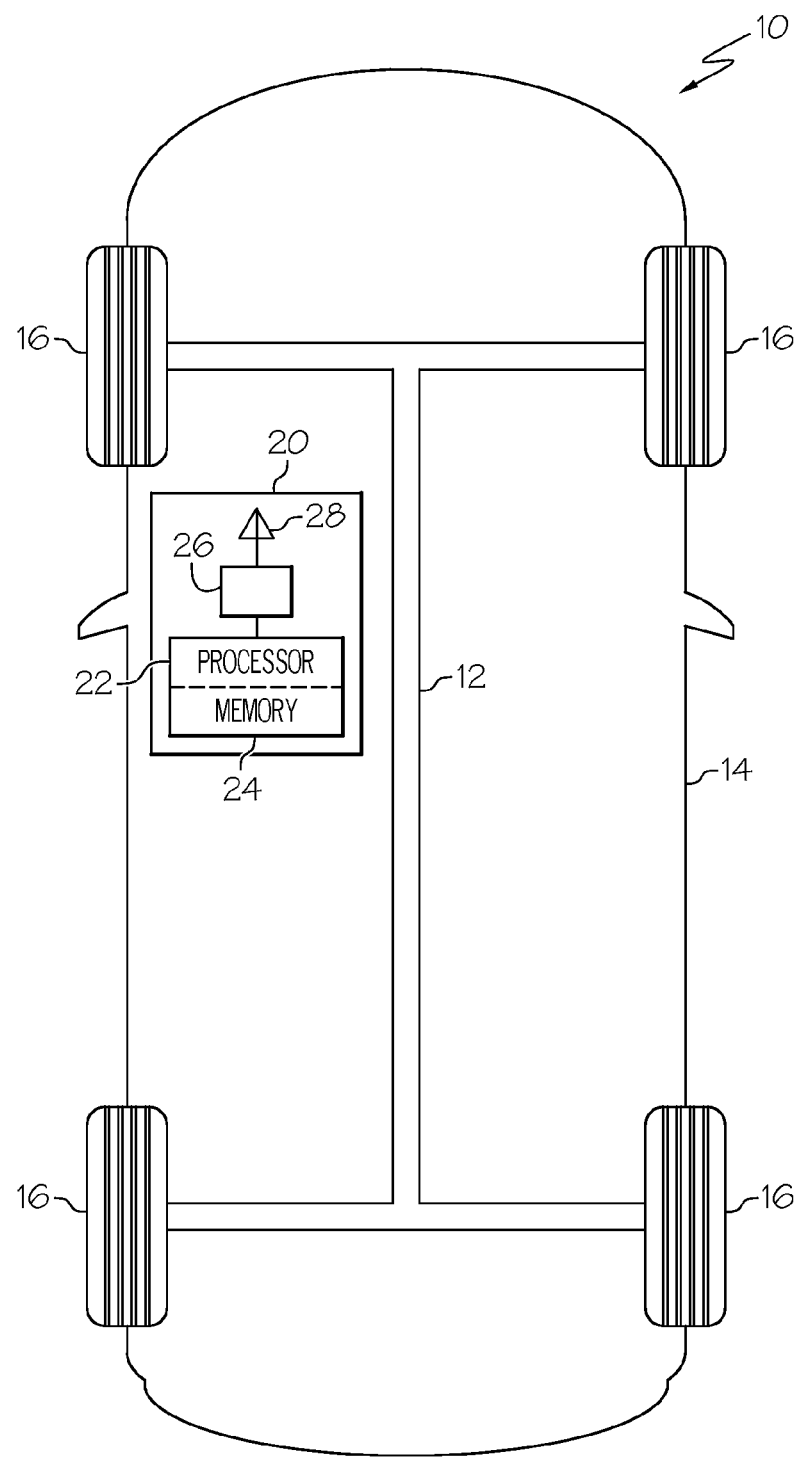
FIG. 1 is a depiction of an exemplary vehicle configured for use with embodiments of the present invention.

FIG. 1 is a depiction of an exemplary vehicle 10 configured for use with one embodiment. The vehicle 10 includes a chassis 12, a body 14, four wheels 16 and a vehicle communication system (VCS) 20. The body 14 is arranged on the chassis 12 and substantially encloses the other components of the vehicle 10. The body 14 and the chassis 12 may jointly form a frame. The wheels 16 are each rotationally coupled to the chassis 12 near a respective corner of the body 14.

The vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD), or all-wheel drive (AWD). The vehicle 10 may also incorporate any one of, or combination of, a number of different types of engines (or actuators), such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, or a fuel cell, a combustion/electric motor hybrid engine, and an electric motor.

In the illustrated embodiment, the VCS 20 includes a processor 22, memory 24, and a wireless transceiver 26. As used herein, the term "processor" may refer to a programmable logic control system (PLC), a microprocessor, or any other type of electronic controller. Further, a "processor" may include one or more components of a digital and/or analog type and may be programmable by software and/or firmware. In addition, as used herein the term "memory" may refer to electronic memory (e.g., ROM, RAM, or another form of electronic memory) and stores instructions and/or data in any format, including source or object code. As further described below, processor 22 generates and stores cryptographic keys and digital certificates that are used to establish secure connections with one or more remote devices.

The wireless transceiver 26 is coupled to a wireless antenna 28 and enables wireless communications between the VCS 20 and an electronic network via a wireless network access point. For example, in one embodiment the wireless transceiver 26 includes a short range wireless communication device that communicates with a wireless router or other short range network communication device. Further, the wireless transceiver 26 may include a cellular modem that is coupled to a cellular phone. In this case, the cellular phone connects the wireless modem to an Internet Service Provided (ISP) modem or other telephonic network access point. It should be noted that in other embodiments, other wireless communication technologies (including satellite) may also be used.

Although the illustrated embodiment depicts a vehicular communication system (e.g., VCS 20), it will be understood by one who is skilled in the art that alternative embodiments of the present invention may utilize other mobile devices as well. Such mobile devices may include a personal computer (e.g., a laptop), a Personal Digital Assistant (PDA), a cell phone, or any other mobile device having a wireless transceiver for receiving the digital certificates and data and a processor for generating the digital certificates and other cryptographic elements described below.

FIG. 2 is a block diagram of an exemplary system 50 for establishing a secure connection between a mobile device and a first remote device. The system 50 includes a mobile device or VCS 52, a database server 54, a first remote device 56, a second remote device 58, and a certificate authority 60. Each of these devices is configured to communicate via an electronic network 61 or other communication medium as further described below.

The mobile device 52 establishes a secure connection with the first remote device 56. As described herein, the mobile device 52 comprises a VCS that includes a processor 66, memory 68, a wireless transceiver 70, and an antenna 72. However, it will be understood by one that is skilled in the art that the mobile device may comprise other mobile computing device as well, such as a laptop, a PDA, a cell phone, and the like.

The database server 54 is maintained and controlled by the manufacturer of the vehicle, or by another trusted entity, and includes a processor 74, a database 76, and a network interface 78. The database 76 associates the public keys for a plurality of mobile devices (e.g., vehicle communication systems), such as the VCS 52, with corresponding descriptive data. The descriptive data includes any information that uniquely identifies the corresponding mobile device. For example, in one embodiment of the database 76, the public keys are associated with a vehicular identification number (VIN) that corresponds to a vehicle and a serial telematic identification number (STID) that corresponds to the vehicle communication system itself. As further described below, the public keys and descriptive data are collected from vehicular communication systems during the production process of the vehicle at a time when both the vehicle and the database server 54 are controlled by the manufacturer or trusted entity. Therefore, the manufacturer or trusted entity is able to ensure that only public keys and descriptive data that correspond to valid vehicular communication systems are stored in database 76. Processor 74 stores information in, and retrieves information from, the database 76. The network interface 78 enables the database server 54 to communicate with the appropriate devices, such as the first remote device 56, on the electronic network 61 as further described below.

The first remote device 56 may be any electronic device that is capable of establishing a secure connection with VCS 52. For example, the first remote device 56 may be an Internet server or other network server that is controlled by a trusted entity, such as the manufacturer of the vehicle or the vehicle dealership, and communicates with the VCS 52 to retrieve diagnostic or user created information for the vehicle, to provide instructions regarding the operation of the vehicle, or to provision the vehicle with additional features or functionalities.

The first remote device 56 includes a processor 80, memory 82, and a network interface 84. As further described below, processor 80 authenticates digital certificates and encrypted messages that it receives from VCS 52. Processor 80 authenticates the digital certificates and encrypted messages using cryptographic keys that are stored in memory 82 or within database 76 on the database server 54. In some embodiments, processor 80 maintains a cached copy of the database 76 in memory 82, while in other embodiments processor 80 communicates with the database server 54 each time it needs information from database 76. The network interface 84 enables the first remote device 56 to communicate with the other devices, such as the VCS 52 and the database server 54, via the electronic network 61 as further described below.

The second remote device 58 is maintained and controlled by the manufacturer of the vehicle or another trusted entity and is configured to generate cryptographic keys that are used by VCS 52 and the first remote device 56 to establish a secure connection (e.g., such as a two-way TLS session). The second remote device 58 includes a processor 100, memory 102, and a network interface 104. Processor 100 generates an asymmetric key pair (hereinafter the "quasi-private key pair") that includes a private key (hereinafter the "quasi-private key") and a public key (hereinafter the "quasi-public key").

The quasi-private key is stored on multiple vehicular communication systems, including VCS 52. For example, a vehicle manufacturer may store the quasi-private key on vehicular communication systems for every vehicle that it produces, vehicles of a certain type, or vehicles that are produced during a certain time period. Thus, the quasi-private key is not a true private key because it is stored in multiple locations (e.g., within multiple vehicular communication systems) rather than only in a single location.

The quasi-public key mathematically corresponds to the quasi-private key and is stored on the first remote device 56. In one embodiment, the second remote device 58 generates a digital certificate (hereinafter the "quasi-public key certificate") that includes the quasi-public key. In addition, the quasi-public key certificate may include an attribute to indicate that the quasi-public key corresponds mathematically to a quasi-private key that cannot be used as a reliable security measure. The second remote device 58 transmits the quasi-public key or, in some embodiments, the quasi-public key certificate, to the first remote device 56 via the electronic network 61 before a secure connection is established between VCS 52 and the first remote device 56. It should be noted that in other embodiments, the quasi-public key certificate may be transferred from the second remote device 58 to the first remote 56 by alternative means. For example, the quasi-public key may be extracted from the second remote device 58 and placed on a CD or other digital media which can be delivered to entity that controls the first remote device 56. The entity that controls the first remote device 56 may then extract the quasi-public key from the CD or other digital media and store it in memory 82.

As further described below, the VCS 52 generates a public key certificate that includes the public key that is associated with VCS 52 in database 76 and that mathematically corresponds to a private key known only to VCS 52. The digital certificate is signed with the quasi-private key. During the creation of a secure connection between the first remote device 56 and VCS 52, the first remote device authenticates this digital certificate with the quasi-public key.

Thus, the quasi-private key pair enables the manufacturer of the vehicle to provision a large number of vehicles with a public key certificate that can be authenticated by the first remote device 56 without incurring the substantial costs associated with obtaining a separate public key certificate for each vehicle from a trusted certificate authority. It should be noted that the public key certificate that is signed with the quasi-private key does not provide the same level of security as a public key certificate that is issued by a trusted certificate authority. For example, a third-party could acquire the quasi-private key from another vehicular communication system and use it to pose as a valid vehicular communication system (e.g., by generating a digital certificate that includes a public key for the third-party, signing the digital certificate with the quasi-private key, and transmitting the digital certificate to the first remote device 56). Therefore, as further described below in order for the first remote device 56 to completely verify the authenticity of a public key certificate that it receives from the VCS 52, the first remote device 56 must verify that the public key within the public key certificate is associated with VCS 52 in database 76. In addition, VCS 52 must demonstrate that it knows the private key that mathematically corresponds to the public key.

Certificate authority 60 is maintained by a trusted third party and is configured to issue a root certificate and one or more public key certificates. The certificate authority 60 includes a processor 106, memory 108, and a network interface 110. The network interface 110 enables the certificate authority 60 to communicate with other devices, such as first remote device 56, via the electronic network 61.

The root certificate for certificate authority is stored on VCS 52 during the production process of the vehicle. The root certificate includes a public key (hereinafter the "CA public key") that mathematically corresponds to a private key (hereinafter the "CA private key") known only to certificate authority 60. Certificate authority 60 also issues a public key certificate to the first remote device 56. This public key certificate includes a public key that mathematically corresponds to a private key for the first remote device 56 and is signed with the CA private key.

The root certificate and public key certificate enable VCS 52 to verify that the first remote device 56 is a trusted entity. As described below, the first remote device 56 transmits the public key certificate to VCS 52. VCS 52 then extracts the CA public key from the root certificate and uses it to verify that the digital signature of the public key certificate was generated with the CA private key. If VCS 52 is able to authenticate the public key certificate, then the first remote device 56 is a trusted entity because it has produced a digital certificate that was signed with a private key that is known only to the trusted certificate authority 60.

FIG. 3 is a flowchart of a method 200 for performing an asymmetric key exchange between a vehicular communication system (e.g., the VCS 52 of FIG. 2) and a remote device (e.g., the first remote device 56 of FIG. 2). It will be noted that although method 200 is described below with regard to a secure connection between VCS 52 and the first remote device of FIG. 2, other embodiments of the present invention may utilize substantially similar methods to establish a secure connection between other suitable mobile devices (e.g., a laptop, PDA, cell-phone and the like) and the first remote device 56. With reference to FIGS. 2 and 3, method 200 ensures that VCS 52 and the first remote device 56 each have the necessary cryptographic components for establishing a secure connection. The steps of method 200 are performed by processor 66 for VCS 52. It is to be understood that certain steps described herein with regard to FIG. 3 may be performed in different orders than the illustrated and described order, and/or some steps may be performed in parallel with each other.

During step 202, processor 66 stores predetermined cryptographic information in memory 68 on VCS 52. The predetermined cryptographic information includes a root certificate and a quasi-private key. As described above, the root certificate is generated by certificate authority 60. Processor 66 utilizes the root certificate to authenticate a public key certificate that VCS 52 receives from the first remote device 56 during a handshake procedure for establishing a secure connection. As described above, the quasi-private key is generated by the second remote device 58 and mathematically corresponds to a quasi-public key.

Next, during step 204, processor 66 generates an asymmetric key pair for the vehicle. The asymmetric key pair includes a private key (hereinafter the "vehicle private key") that mathematically corresponds to a public key (hereinafter the "vehicle public key"). Processor 66 stores the vehicle private key and vehicle public key in memory 68 (step 206). The vehicle private key is known only to VCS 52. VCS 52 is able to provide reliable evidence of its identity to the first remote device 56 by demonstrating knowledge of the vehicle private key.

Next, during step 208 the processor 66 provides the vehicle public key and descriptive data for the VCS 52 to the manufacturer or another trusted entity during the production process of the vehicle so that they can be stored in the database 76 on the database server 54. For example, the processor 66 may transmit the public key for the VCS 52 and the appropriate VIN and STID to one or more devices that are utilized by the manufacturer to collect such information during the production process of the vehicle. The manufacturer or trusted entity associates the public key for the VCS 52 with the VIN and STID in the database 76 on the database server 54.

Processor then 66 generates a digital certificate (hereinafter the "vehicle public key certificate") during step 210. The vehicle public key certificate includes the vehicle public key and a digital signature. Processor 66 generates the digital signature with the quasi-private key stored in memory 68 during step 202. In one embodiment, the first digital certificate conforms to the X.509 standard for digital certificates.

Upon the completion of method 200, VCS 52 has the root certificate for certificate authority 60 and the digitally signed vehicle public key certificate stored in memory 68. These cryptographic components enable VCS 52 to establish a secure connection with the first remote device 56 by participating in a handshake procedure that involves an exchange of digital certificates. Embodiments may be used in connection with any secure communication protocol that requires the communicating parties (e.g., VCS 52 and the first remote device 56) to exchange digital certificates. For example, VCS 52 and the first remote device 56 may participate in a two-way TLS handshake for establishing a two-way TLS session in which the first remote device 56 is the TLS server and VCS 52 is the TLS client.

During this two-way TLS handshake, the first remote device 56 transmits a public key certificate issued by certificate authority 60 to VCS 52. As described above, the public key certificate includes a public key for the first remote device 56 and is digitally signed with the CA private key. Upon receiving the public key certificate, processor 66 for VCS 52 extracts the CA public key from the root certificate. Processor 66 uses the CA public key to authenticate the public key certificate by verifying that the digital signature of the public key certificate was generated with the CA private key. If processor 66 is able to authenticate the public key certificate, the two-way TLS handshake continues. Alternatively, if processor 66 is not able to authenticate the public key certificate, the VCS 52 generates an error message that terminates the two-way TLS handshake.

In addition, during the two-way TLS handshake VCS 52 transmits the vehicle public key certificate to the first remote device 56. As described above, the vehicle public key certificate is generated by the processor 66 for VCS 52 during step 210 of method 200 and includes the vehicle public key and a digital signature generated with the quasi-private key. The first remote device 56 uses the vehicle public key certificate to partially authenticate VCS 52. This partial authentication verifies that VCS 52 has knowledge of the quasi-private key. As described above, partial authentication is not a reliable security measure because it is based on knowledge of the quasi-private key which is known by a plurality of vehicular communication systems.

During partial authentication, processor 80 for the first remote device 56 retrieves the quasi-public key from memory 82. As described above, the quasi-public key is generated by the second remote device 58 and transmitted to the first remote device 56 (e.g., within a quasi-public key certificate). Processor 80 uses the quasi-public key to verify that the digital signature for the vehicle public key certificate was generated with the quasi-private key. If processor 80 is able to verify this digital signature, then VCS 52 has demonstrated knowledge of the quasi-private key. In this case, processor 80 stores the vehicle public key certificate, including the vehicle public key, in memory 82 and continues to perform the two-way TLS handshake. Alternatively, if processor 80 is not able to authenticate the digital signature for the vehicle public key certificate or if the vehicle public key does not correspond to descriptive data, processor 80 generates an error message that terminates the two-way TLS handshake.

As described above, the first remote device 56 fully authenticates VCS 52 by verifying that the vehicle public key is associated with a valid vehicular communication system within database 76 and verifying that the VCS 52 knows the vehicle private key. To verify that the vehicle public key is associated with a valid vehicular communication system within database 76, processor 80 of the first remote device 56, queries database 76 to determine if it has associated the vehicle public key with descriptive data (e.g., a VIN and STID) for a vehicular communication system. Processor 80 may query the database server 54 or it may check a cached copy of database 76 that is stored in memory 82. Further, in some embodiments, the vehicle public key certificate may include a VIN and/or STID enabling the first remote device 56 to ensure that the vehicle public key is associated with descriptive data for VCS 52 (and not a different vehicular communication system) in database 76. If processor 80 determines that the vehicle public key is not associated with a vehicular communication system within database 76, then it determines that VCS 52 is not a trusted entity and the two-way TLS session is terminated.

It should be noted that processor 80 may verify that the vehicle public key is stored in database 76 during the establishment of the two-way TLS session (e.g., directly after processor 80 authenticates the vehicle public key certificate) or after the two-way TLS session handshake is completed. However, full authentication of the VCS 52 cannot occur until processor 80 has confirmed that the vehicle public key is associated with a valid vehicular communication system in database 76.

As described above, in order for the first remote device 56 to fully authenticate VCS 52, VCS 52 must also demonstrate that is has knowledge of the vehicle private key. It will be understood by one of ordinary skill in the art that this can be accomplished by having the VCS 52 sign a predetermined message with the vehicle private key and transmit the digital signature to the first remote device 56. The first remote device 56 may then utilize the vehicle public key to authenticate the digital signature. In addition, it will also be understood by one who is skilled in the art that this step is accomplished as part of the two-way TLS protocol which provides a mechanism that allows both the first remote device 56 and the VCS 52 to demonstrate that they have knowledge of their own private keys.

Finally, it should be noted that under some circumstances it may not be necessary or practical for the first remote device 56 to fully authenticate VCS 52 in order to exchange non-critical information. For example, if the first remote device 56 comprises a laptop that cannot access database 76 it may not be able to fully authenticate the VCS 52. However, the first remote device 56 is still able to verify that the VCS 52 knows the quasi-private key (e.g., by authenticating the digital signature for the vehicle public key certificate) and that the VCS 52 knows a private key that corresponds to the vehicle public key within the vehicle public key certificate. In this case, the first remote device 56 may be reasonably sure that it is communicating with VCS 52 enabling the first remote device 56 and VCS 52 to exchange non-critical information such as information identifying and describing the vehicle such as the VIN and mileage.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for establishing a secure connection between a remote device and a vehicle communication system deployed onboard a vehicle, the vehicle communication system (VCS), the method comprising:

receiving, at the VSC, a root certificate and a quasi-private key generated by a trusted entity, the quasi-private key mathematically corresponding to a quasi-public key;

storing the root certificate and the quasi-private key on a memory of the vehicle communication system, the quasi-private key are also stored on a plurality of other vehicles in addition to the vehicle on which the vehicle communication system is deployed;

generating, by the VSC, an asymmetric key pair including a vehicle public key and a vehicle private key mathematically corresponding to the vehicle public key;

providing, by the VSC, the generated vehicle public key and descriptive data uniquely identifying the vehicle communication system to the trusted entity during production of the vehicle, wherein the vehicle public key and the descriptive data are associated and stored in a vehicle public key database accessible by other devices;

generating, by the VSC, a vehicle public key certificate comprising the vehicle public key and a digital signature signed using the quasi-private key;

performing a mutual authentication procedure by
receiving a public key certificate, issued by the trusted entity, from the remote device;
verifying, by the VSC, the received public key certificate using the public key of the trusted entity extracted from the root certificate;
in response to the public key certificate is authenticated, transmitting, by the VSC, the vehicle public key certificate to the remote device allowing the remote device to verify the digital signature included in the vehicle public key certificate using the quasi-public key and allowing the remote device to further authenticate the VCS by ensuring that the vehicle public key corresponds to the descriptive data uniquely identifying the VCS; and
generating, by the VSC, a digital signature by singing a predetermined message using the vehicle private key; and
transmit the generated digital signature to the remote device allowing the remote device to verify the generated digital signature using the vehicle public key.

2. A method for establishing a secure connection between a remote device and a vehicle communication system (VCS) deployed onboard a vehicle, the method comprising:

receiving, at the VCS, a root certificate and a quasi-private key generated by a trusted entity, the quasi-private key mathematically corresponding to a quasi-public key and stored on a plurality of other vehicles in addition to the vehicle on which the vehicle communication system is deployed;

storing the root certificate and the quasi-private key on a memory of the VCS;

generating, by the VCS, an asymmetric key pair including a vehicle public key and a vehicle private key mathematically corresponding to the vehicle public key;

providing, by the VCS, the generated vehicle public key and descriptive data uniquely identifying the vehicle communication system to the trusted entity during production of the vehicle to enable storage of the vehicle public key and the descriptive data in a vehicle public key database accessible by other devices;

generating, by the VCS, a vehicle public key certificate comprising the vehicle public key and a digital signature signed using the quasi-private key; and establishing a secure connection between the remote device and the vehicle communication system by, at least in part, transmitting the vehicle public key certificate to the remote device to allow the remote device to verify the digital signature included in the vehicle public key certificate using the quasi-public key and to further allow the remote device to authenticate the VCS by ensuring that the vehicle public key.

3. The method according to claim 2, wherein the vehicle public key certificate is transmitted to the remote device as part of a Transport Layer Security handshake procedure.

4. The method according to claim 2, further comprising:
generating, by the VCS, a digital signature by signing a predetermined message using the vehicle private key; and
transmitting, from the VCS, the generated digital signature to the remote device allowing the remote device to verify the generated digital signature using the vehicle public key.

5. The method according to claim 2, further comprising:
receiving, at the VCS, a public key certificate from the remote device; and
verifying, by the VCS, the received public key certificate using the public key of the trusted entity extracted from the root certificate.

6. A vehicular communication system (VSC) for establishing a secure connection with a remote device, the vehicular communication system comprising:

a wireless transceiver configured to communicate with the remote device;
an electronic memory; and
a processor coupled to the wireless transceiver and to the electronic memory, the processor configured to perform the steps of:

receiving, at the VCS, a root certificate and a quasi-private key generated by a trusted entity, the quasi-private key mathematically corresponding to a quasi-public key and stored on a plurality of other vehicles in addition to the vehicle on which the vehicle communication system is deployed;

storing the root certificate and the quasi-private key on the memory of the VCS;

generating, by the VCS, an asymmetric key pair including a vehicle public key and a vehicle private key mathematically corresponding to the vehicle public key;

providing, by the VCS, the generated vehicle public key and descriptive data uniquely identifying the vehicle communication system to the trusted entity during production of the vehicle to enable storage of the vehicle public key and the descriptive data in a vehicle public key database accessible by other devices;

generating, by the VCS, a vehicle public key certificate comprising the vehicle public key and a digital signature signed using the quasi-private key; and establishing a secure connection between the remote device and the vehicle communication system by, at least in part, transmitting the vehicle public key certificate via the wireless transceiver to the remote device to allow the remote device to verify the digital signature included in the vehicle public key certificate using the quasi-public key and to further allow the remote device to authenticate the VCS by ensuring that the vehicle public key corresponds to the descriptive data uniquely identifying the VCS, as stored in the vehicle public key database.

7. The vehicular communication system according to claim 6, wherein the processor is further configured to digitally sign a message with the vehicle private key and to transmit the message and the digital signature to the remote device during the authentication procedure.

8. The vehicular communication system according to claim 6, wherein:

the electronic memory further stores a root certificate generated by a trusted certificate authority and comprising a first public key mathematically corresponding to a first private key stored on the trusted certificate authority;

and wherein, during the authentication procedure, the processor is further configured to:

receive a public key certificate from the remote device comprising a second public key mathematically corresponding to a second private key stored on the remote device and a second digital signature generated using the first private key; and authenticate the public key certificate using the second digital signature and the first public key.

\* \* \* \* \*